United States Patent [19]

Agnoff

[11] Patent Number: 5,230,418
[45] Date of Patent: Jul. 27, 1993

[54] PHOTO-OPTIC ATTACHMENT FOR CONVEYOR ROLLERS

[75] Inventor: Charles Agnoff, Wilmington, N.C.

[73] Assignee: Interroll Holding A.G., San Antonio, Switzerland

[21] Appl. No.: 975,051

[22] Filed: Nov. 12, 1992

[51] Int. Cl.⁵ .................................................. B65G 43/00
[52] U.S. Cl. ................................ 198/502.4; 198/781; 482/54
[58] Field of Search .................. 198/502.3, 502.4, 810, 198/781, 365; 482/3, 7, 54

[56] References Cited

U.S. PATENT DOCUMENTS

| | | | |
|---|---|---|---|
| 3,722,660 | 3/1973 | Snead | 198/810 |
| 3,845,375 | 10/1974 | Stiebel | 198/502.4 |
| 3,986,596 | 10/1976 | Hamilton | 198/365 |
| 4,448,820 | 5/1984 | Buschor | 198/502.3 |
| 4,659,074 | 4/1987 | Taitel et al. | 482/54 |
| 5,062,626 | 11/1991 | Dalebout et al. | 482/54 |

Primary Examiner—Joseph E. Valenza
Attorney, Agent, or Firm—Rhodes, Coats & Bennett

[57] ABSTRACT

A photo-optic attachment for a conveyor roller comprises an end cap mountable on the conveyor roller and a photo-optic disc mountable on the end cap. The end cap includes an outwardly facing surface having a raised boss. The photo-optic disc includes an opening sized and shaped to register with the boss on the end cap. The photo-optic disc is retained on the end cap by a spring clip which is insertable over the end of the boss. The shape of the boss and the opening in the photo-optic disc is such to prevent relative rotation between the end cap and the photo-optic disc thereby providing a more accurate measure of the conveyor roller speed.

10 Claims, 3 Drawing Sheets

PHOTO-OPTIC ATTACHMENT FOR CONVEYOR ROLLERS

FIELD OF THE INVENTION

The present invention relates generally to belt conveyors, and more particularly to speed controls for belt conveyors.

BACKGROUND OF THE INVENTION

On many belt conveyors, and particularly on treadmills, it is necessary to maintain accurate control over the speed of the conveyor. Numerous electronic devices are available for controlling the speed of the electric motor which powers the conveyor belt. Such device typically employ a feedback signal to the motor controller that is proportional to the conveyor belt speed. When the speed of the conveyor belt deviates from its predetermined settings, the motor controller is operative to adjust the speed of the conveyor to bring it back to its predetermined setting.

Photo-optic methods are frequently used to measure the speed of the conveyor. One such method uses a photo-optic disc mounted on the output shaft of the motor. A light emitter is disposed on one side of the disc, and a light detector is disposed on the opposite of the disc. As the motor runs, the photo-optic disc periodically interrupts the transmission of light from the emitter to the detector. The frequency of the resulting on/off signals is fed back to the electronic controller to provide an indication of the conveyor belt speed. In this manner, reasonably accurate speed control can be obtained.

There are several drawbacks with the prior art method of mounting an optical disc on the motor output shaft. Typically, the motor is not directly connected to the conveyor belt pulley, but uses a belt drive arrangement. As the belt drives wear, slippage can occur between the belt and the pulleys. As a result, the indicated speed does not always match the actual speed of the conveyor belt. Additionally, mounting a photo-optic disc on the motor requires additional parts, such as shaft adapters. These additional parts increase the cost of the equipment.

SUMMARY AND OBJECTS OF THE INVENTION

The present invention overcomes the aforementioned problems with the prior art by providing a method for directly mounting a photo-optic disc on the conveyor roller or pulley. Because the photo-optic disc is mounted directly on the roller, it provides a more accurate indication of conveyor belt speed. Further, the method of the present invention is simpler and more economical than prior art methods.

To briefly summarize, the conveyor pulley or roller has a plastic end cap inserted into each end of the roller. A double "D" shaped boss is formed on the outer surface of the end cap which mates with a similarly shaped opening in a photo-optic disc. A push-on, spring-steel fastener is inserted over the boss to securely lock the photo-optic disc in place. The shape of the boss prevents any possibility of slippage between the photo-optic disc roller. Thus, maximum speed control accuracy is assured. Further, because of the boss is integrally formed on the end cap, no additional mounting hardware is required.

Based on the foregoing, it is a primary object of the present invention to provide a method and apparatus for mounting a photo-optic disc or similar speed control device on a conveyor roller to provide a direct measure of the speed of the conveyor roller.

Another object of the present invention is to provide a method and apparatus for mounting a photo-optic disc or similar speed control device on a conveyor roller which is simple in construction and contains a relatively small number of components.

Yet, another object of the present invention is to provide a method and apparatus for mounting a photo-optic disc or similar speed control device on a conveyor roller which is economical to manufacture.

Still another object of the present invention is to provide a method and apparatus for mounting a photo-optic disc or similar speed control device on a conveyor roller which is easy to install, replace and maintain.

DETAILED DESCRIPTION OF THE INVENTION

Figure 1:
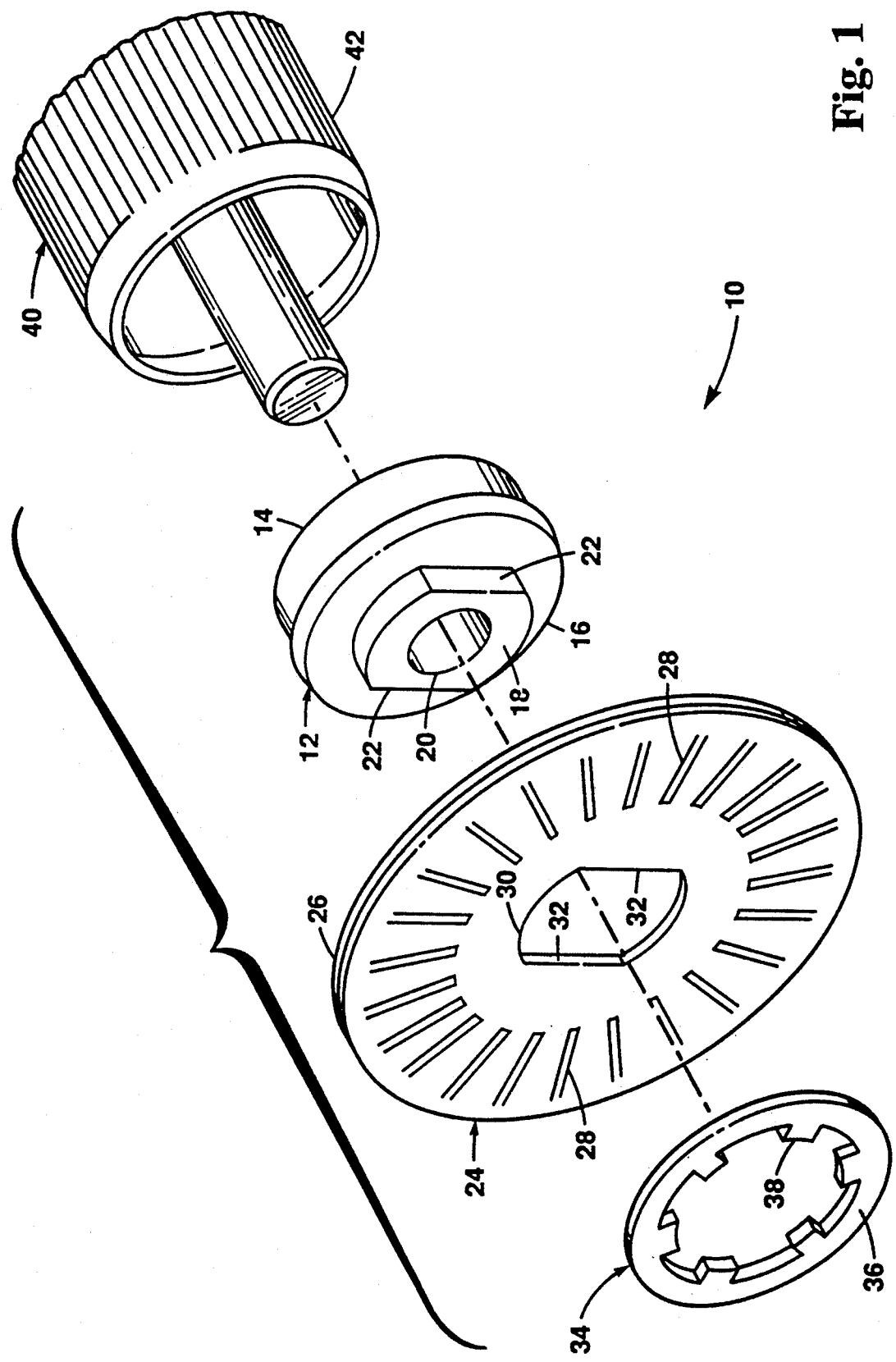
FIG. 1 is an exploded perspective view showing the photo-optic disc and mounting system.

Referring now to the drawings, the photo-optic attachment system of the present invention is shown and indicated generally be the numeral 10. The photo-optic attachment system is intended for use in connection with a conventional conveyor roller or pulley which is indicated generally at 40. The conveyor roller 40 comprises a generally hollow tube 42 which is rotatably mounted on a stationary roller shaft 44 by means of bearings 46. The bearings 46 are typically housed within an end cap 12 fitted into each end of the roller tube 42. The photo-optic attachment system 10 of the present invention utilizes the end cap 42 for mounting a photo-optic disc 24 to the conveyor roller 40. In effect, the mounting system is made integral with the end cap 12 thereby eliminating the need for additional hardware to mount the photo-optic disc 24.

The end caps 12, which are preferably made of an insulating material such as nylon, are press-fit into respective ends of the roller tube 42. Each end cap 12 includes an end wall portion 16 and a sleeve portion 14 which are integrally formed as a single unit. The sleeve portion 14 has an outside diameter approximately equal to the inside diameter of the roller tube 42 and should preferably provide a snug fit. If desired, the end of the roller tube 42 and the end cap 12 can be swedged to provide some degree of mechanical locking. The end wall portion 16 of the end cap 12 has a diameter approximately equal to the outside diameter of the roller tube 42 and defines a shoulder which abuts against the end of the roller tube 42.

A boss 18 is integrally formed on the outer surface of the end wall 16 of the end cap 12 for mounting the photo-optic disc 24. The boss 18 is shaped like a truncated circle having two diametrically opposed flats 22. The purpose of the flats 22 is to prevent rotation of the photo-optic disc 24 on the end cap 12. A central opening 20 is formed at the center of the boss 18 which also extends through the end wall 16 to accommodate the roller shaft 44.

As previously indicated, the photo-optic disc 24 is mounted on the end cap 12. The photo-optic disc 24 includes two or more circular discs 26 which are laminated together. The circular discs 26 are made from a plastic material, such as polyethylene, which is translucent to infrared light. A plurality of radially extending bars 28 are disposed between the circular discs 26. The bars 28 are circumferentially spaced at predetermined increments. The bars 28 are opaque to infrared light. The opaque bars 28 may, for instance, consist of black ink silk screened on the surface of one of the circular discs 26 prior to laminating the circular discs 26 together. The function of the opaque bars 28 is to provide indicia which can be sensed by a photo-optic detector to provide a measure of the rotational speed of the disc 24.

An alternative design for the photo-optic disc could utilize an opaque disc having stamped openings in place of the opaque bars.

The photo-optic disc 24 includes a central opening 30 to facilitate mounting the photo-optic disc 24 on the end cap 12. The opening 30 is formed in the center of the photo-optic disc 24 and has two flat sides 32 which register with the flats 22 on the boss 18. Thus, the shape of the boss 18 and the central opening 30 and the photo-optic disc 24 prevents relative rotation between the photo-optic disc 24 and the end cap 12.

Figure 2:
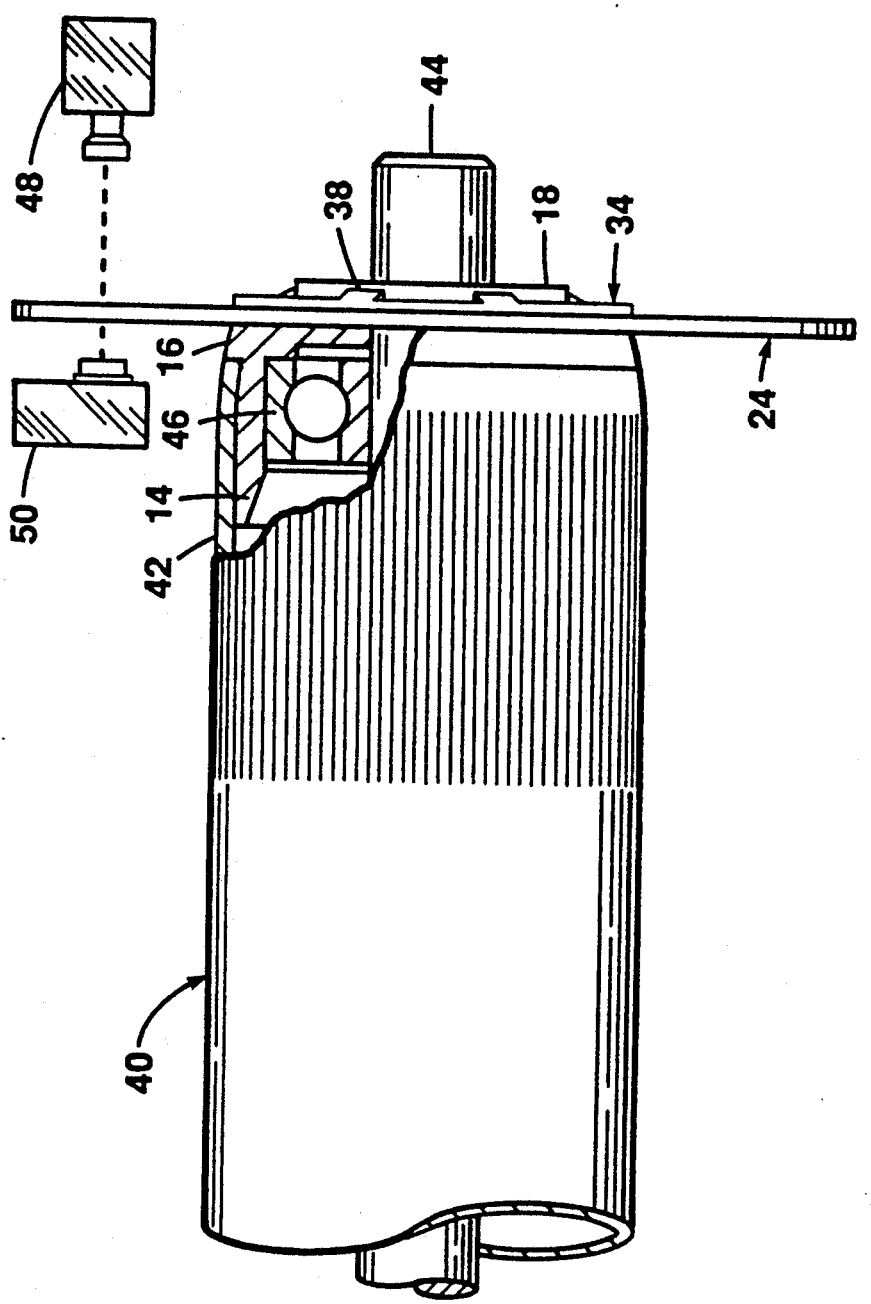
FIG. 2 is an elevation view of the photo-optic disc mounted on a conveyor roller.
Figure 3:
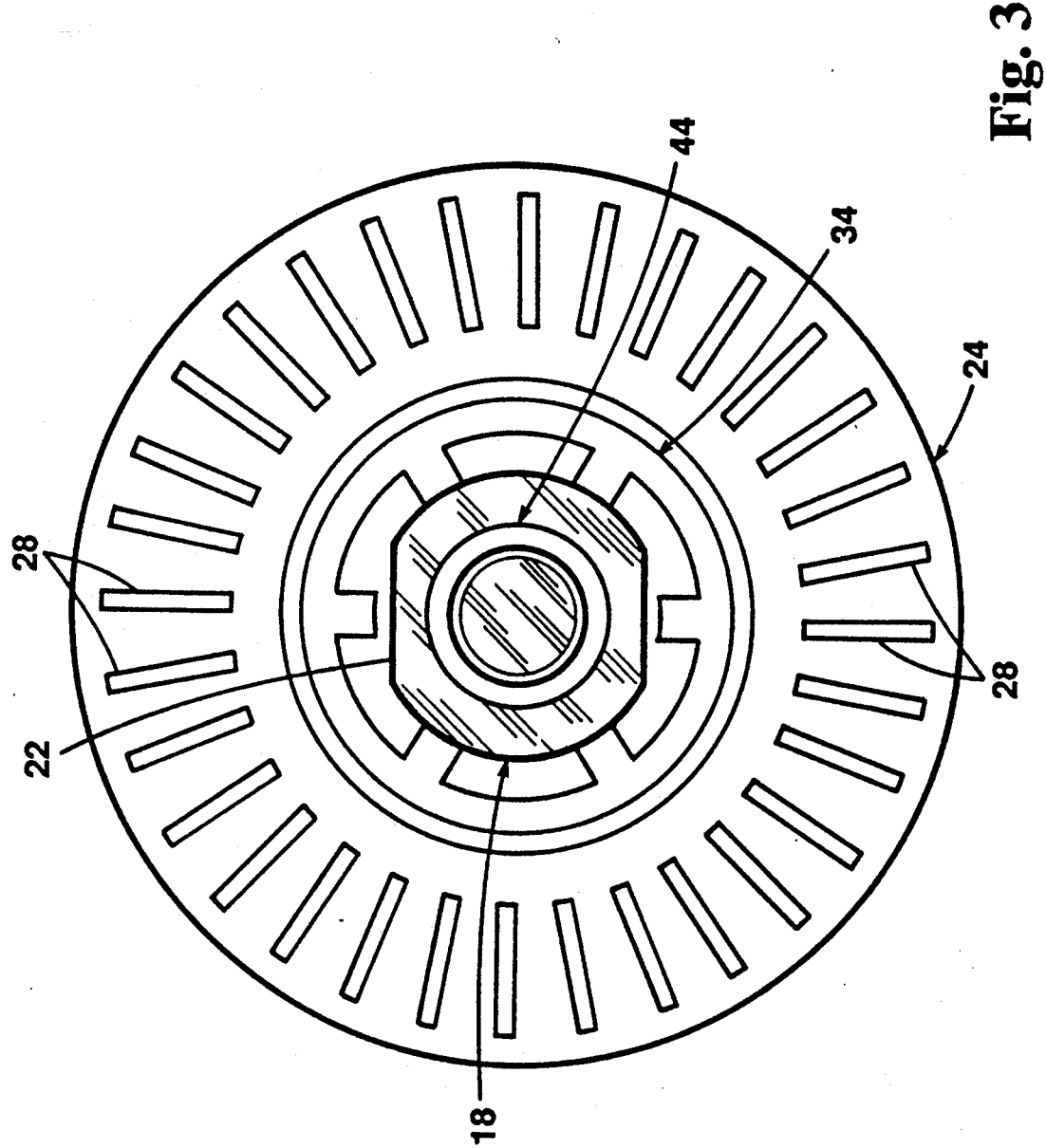
FIG. 3 is an end view of the photo-optic disc and the mounting system.

The photo-optic disc 24 is retained on the end cap 12 by the spring clip 34. A spring clip 34 includes an outer ring 36 and a plurality of inwardly projecting, deformable tabs 38. The inside diameter of the spring clip 34 (measured from the inner end of the tabs 38) is slightly smaller than the diameter of the boss 18. The spring clip 34 is pressed on to the boss 18 adjacent the outer surface of the photo-optic disc 24. As the spring clip 34 is pressed onto the boss 18, the deformable tabs 38 bend outwardly, as shown best in FIG. 2. Thus, the tabs 38 grip the boss 18 to prevent removal of the spring clip 34.

In use, the end caps 12 are fit into the end of the conveyor roller 40 such that the roller shaft 44 projects through the opening 20 in the end cap 12. The end cap 12 of the present invention replaces the conventional end cap. The conveyor roller 40 can be used in a conventional manner without the photo-optic disc 24. To mount the photo-optic disc 24 on the conveyor roller 10, the central opening 30 on disc 24 is aligned with the boss 18. The disc 24 is then mounted onto the end cap 12 such that the boss 18 on the end cap 12 is received in the central opening 30 of the photo-optic disc 24. The spring clip 34 is then pressed onto the boss 18 so as to firmly press the photo-optic disc 24 against the end wall 16 of the end cap 124.

Once the photo-optic disc 24 is mounted on the roller 10, a light emitter 48 and a light detector 50 are disposed on opposite sides of the disc 24. (See FIG. 2) The light emitter 48 directs infrared light through the photo-optic disc 24 onto the light detector 50. As the conveyor roller 10 rotates, the opaque bars 28 on the photo-optic disc 24 intermittently interrupt the transmission of light between the emitter 48 and the detector 50. Thus, the detector 50 produces an intermittent on/off signal. The frequency of this on/off signal is proportional to the speed of the conveyor roller 40. The signal from the photo detector 50 is transmitted by conventional methods to an electronic controller which controls the speed of the roller 40.

Based on the foregoing, it is apparent that the photo-optic disc 24 and mounting system of the present invention provides a more accurate measure of the speed of the conveyor roller than prior art systems. Furthermore, by mounting the photo-optic disc 24 directly on the conveyor roller, it is possible to eliminate certain components, such as shaft adapters. The mounting system of the present invention is easy to use and allows quick installation and removal of the photo-optic disc from the conveyor roller.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A photo-optic attachment for a conveyor roller comprising:
    (a) an end cap mountable on the conveyor roller and including an outwardly facing surface and a raised boss formed on said outwardly facing surface;
    (b) a photo-optic disc mountable on the end cap, said photo-optic disc including an opening sized and shaped to register with the boss on the end cap; and
    (c) retaining means insertable over the end of the boss for securing the photo-optic disc on the end cap.

2. The photo-optic attachment according to claim 1 wherein said retaining means comprises a spring clip.

3. The photo-optic attachment according to claim 1 wherein said boss includes means to prevent rotation of the photo-optic disc relative to the end cap.

4. The photo-optic attachment according to claim 3 wherein the means for preventing rotation of the photo-optic disc comprises a flat formed on said boss which registers with a corresponding flat formed in the opening in the photo-optic disc.

5. The photo-optic attachment for a conveyor roller including a generally hollow roller tube and a pair of end caps inserted into respective ends on said roller tube, said attachment systems comprising:
    (a) a raised boss formed on an outwardly facing surface of a selected end cap;
    (b) a photo-optic disc mountable on the selected end cap including an opening sized and shaped to register with the boss on the end cap;
    (c) means to prevent relative rotation between the end cap and the photo-optic disc; and
    (d) retaining means for securing the photo-optic disc on the end cap.

6. The photo-optic attachment system of claim 5 wherein the retaining means comprises a spring clip insertable over the end of the boss.

7. A photo-optic attachment for a conveyor roller comprising:
    (a) an end cap mountable on the conveyor roller including:
        (1) a sleeve portion insertable into an open end on the conveyor roller;
        (2) an end wall having an outwardly facing surface and engageable with the end of the roller tube;
        (3) a raised boss formed on the outer surface of the end wall;
    (b) a photo-optic disc mountable on the end cap including an opening sized and shaped to register with the boss on the end wall; and
    (c) retaining means for securing the photo-optic disc on the end cap.

8. The photo-optic attachment according to claim 1 further including positioning means for preventing relative rotation between the end cap and the photo-optic disc.

9. The photo-optic attachment according to claim 8 wherein the positioning means includes a flat formed on the boss and a corresponding flat formed in the opening in the photo-optic disc which registers with the flat on the boss.

10. The photo-optic attachment according to claim 1 wherein the retaining means comprises a spring clip insertable over the end of the boss.

* * * * *